April 21, 1959 R. F. ONSRUD 2,882,865
POSITIONING CONTROL MEANS FOR UNIVERSAL ROUTER
Filed June 2, 1955 3 Sheets-Sheet 1

INVENTOR:
RUDOLPH F. ONSRUD
BY
ATT'YS

April 21, 1959 R. F. ONSRUD 2,882,865
POSITIONING CONTROL MEANS FOR UNIVERSAL ROUTER
Filed June 2, 1955 3 Sheets-Sheet 2

*INVENTOR:*
RUDOLPH F. ONSRUD
BY
ATT'YS

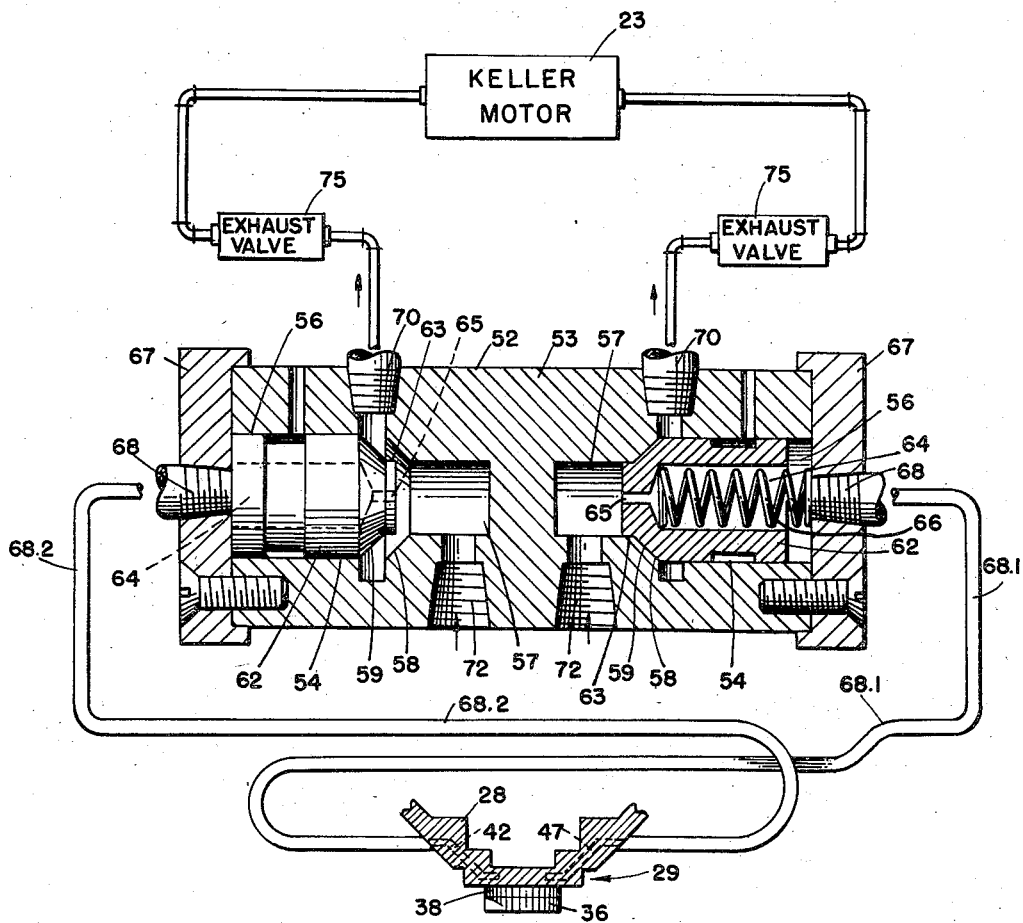
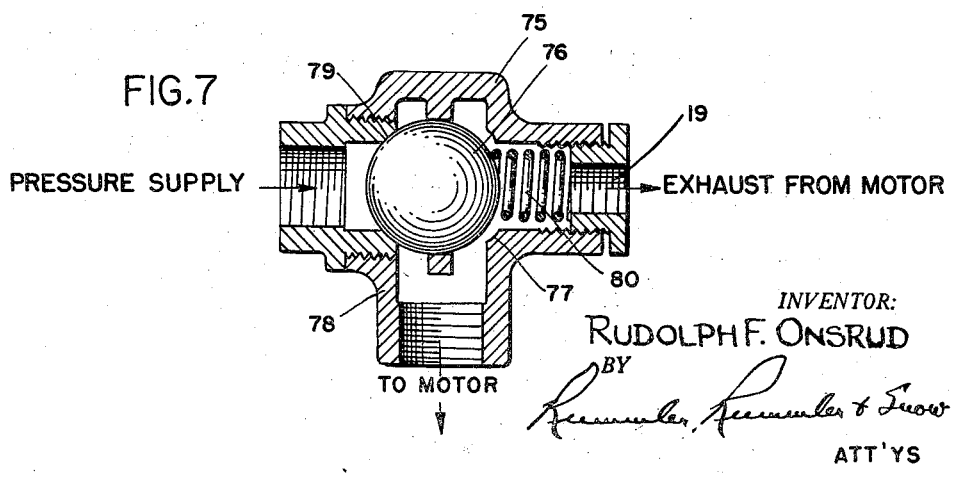

United States Patent Office 2,882,865
Patented Apr. 21, 1959

2,882,865
POSITIONING CONTROL MEANS FOR UNIVERSAL ROUTER

Rudolph F. Onsrud, Niles, Ill., assignor to Onsrud Machine Works, Inc., Chicago, Ill.

Application June 2, 1955, Serial No. 512,803

6 Claims. (Cl. 121—41)

This invention relates to milling machines and more particularly to an improvement in a universal router of the type disclosed in my copending application Serial No. 269,170, filed January 31, 1952, now Patent No. 2,734,428.

The router shown and described in my copending application includes an elongated bed, a carriage movable longitudinally with respect to the bed, a mount arranged to slide on the carriage transversely with respect to the bed, a support ring rotatably disposed on the mount, and a milling head assembly carried by a radial arm pivotally arranged on the ring for limited movement in an arcuate path in a horizontal plane in response to variations in the profile of a template. The milling head has a cutter which is urged into engagement with the edge of the workpiece by a pneumatic compensator. This compensator effects a yielding force tangential to the arc of movement of the milling head. To assure that the force of the compensator acts substantially normally to the edge of the workpiece regardless of direction changes in the template profile the support ring is rotated by a fluid motor to shift the position of the radial arm pivot according to the template contour and the direction of rotation of the motor is determined by an operator who follows the relation of the cutter to the template visually. A disadvantage of this arrangement is that when direction changes are anticipated by the operator the speed of the milling head must be decreased to prevent overtravel of the cutter, particularly when there are sharp changes in the contour of the template. Even at reduced speeds external bulbing and internal nicks occur in the work because of the human error factor in changing the position of the radial arm pivot.

With the foregoing in mind a principal object of the invention is to provide a positioning control valve system for a universal router of the type described wherein the support ring may be instantaneously and automatically rotated to a position in which the pneumatic compensator is effective to urge the cutter into contact with the edge of the work piece in a direction substantially normal to the cutter path.

Another object of the invention is to provide a device of mentioned character in which the support ring is automatically rotated to the required position in response to variations of the contour of the template.

A further object of the invention is to provide a device of the stated type in which a fluid under pressure affords rotation of the support ring and determines, in response to changes in the contour of the template, the direction of rotation of the ring.

A more particular object of the invention is to provide an automatic router of the type described in my copending application in which a valve instantaneously directs secondary fluid to close a control valve for selective diversion of primary fluid to rotate the support ring in one direction or the other.

Other and further objects, advantages and features of the present invention will be apparent to those skilled in the art from the following description, taken in conjunction with the accompanying drawing, in which similar reference characters relate to similar parts and in which:

Fig. 6 is an elevational view, partly in section of the control valve used in the positioning control means of the present invention and showing diagrammatically the primary and secondary fluid systems; and Fig. 7 is a vertical sectional view of an exhaust valve of the type shown diagrammatically in Fig. 6.

Figure 1:
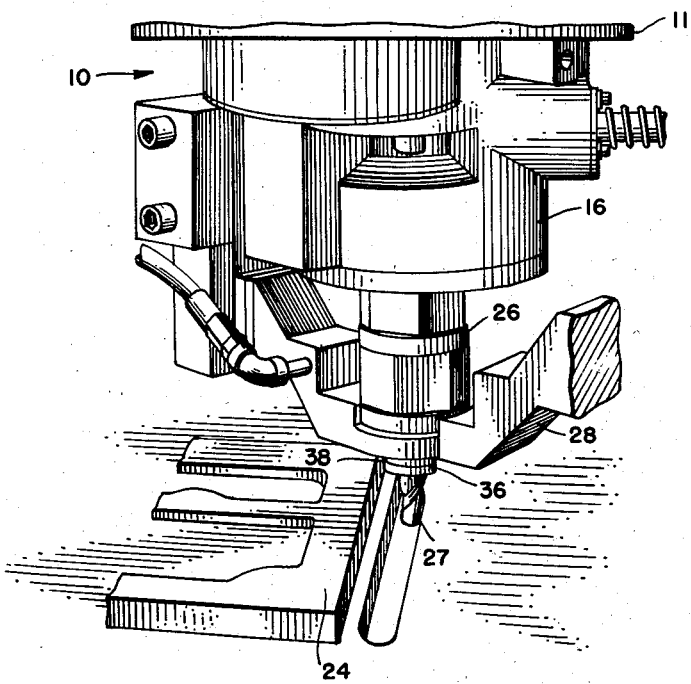
Figure 1 is a view in perspective of a milling head assembly made in accordance with the present invention.
Figure 2:
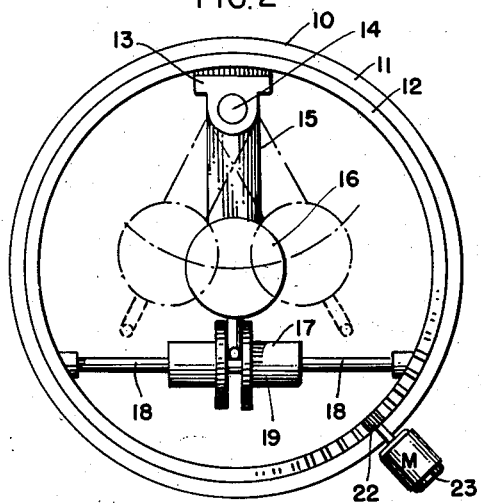
Fig. 2 is an enlarged diagrammatic plan view showing the mount, support ring, radial arm, milling head assembly and compensator of the present invention in operative position, and showing, in dot-and-dash lines the range of pivotal movement of the radial arm.
Figure 3:
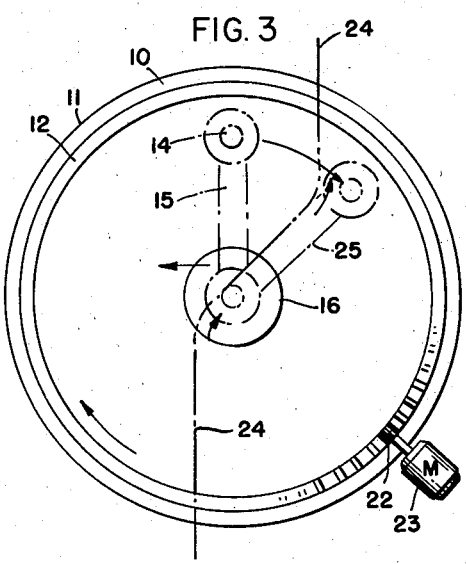
Fig. 3 is an enlarged diagrammatic plan view similar to Fig. 2, but showing the radial arm in the position it assumes when the support ring is rotated in response to the contour of the template.

With reference to the drawings, and more particularly to Figs. 2 and 3 the numeral 10 represents a workhead assembly of the type shown and described in my above identified copending application. This assembly includes a relatively fixed circular mount 11 on which a support ring 12 is rotatably mounted. Secured to the inner surface of the support ring 12 is a bearing box 13 in which a standard 14 is rotatably mounted. A radial arm 15 is secured at one end to the standard, and the other end of this arm carries a milling head assembly 16. Limited pivotal movement of the arm 15 is afforded by a pneumatic compensator 17 which provides a resiliently yielding force acting substantially tangentially to the arc of movement of the arm. The compensator 17 includes a pair of piston rods 18 joined to a stationary piston (not shown), and forming a chord substantially normal to the arm 15. Fluid under pressure is supplied to urge a cylinder 19 to the left or right, as viewed in Fig. 2, to maintain the milling head assembly in normal relation to the edge of the workpiece. The support ring 12 is provided with a plurality of teeth which are engaged by the teeth of a pinion 22 of a reversible fluid motor 23, which is desirably an air motor of the Keller type. As the profile of the template 24, shown in dot-and-dash lines in Fig. 3, changes the support ring 12 is rotated to the position shown at 25. In this position the compensator 17 is effective to retain the milling head assembly in contact with the edge of the workpiece corresponding to the template, as will be understood. Referring to Fig. 1 the milling head assembly 16 includes a spindle 26 having a cutter 27 and a control yoke 28, for a purpose hereafter described. The foregoing arrangement is fully described in my before-mentioned Patent No. 2,734,428.

Figure 4:
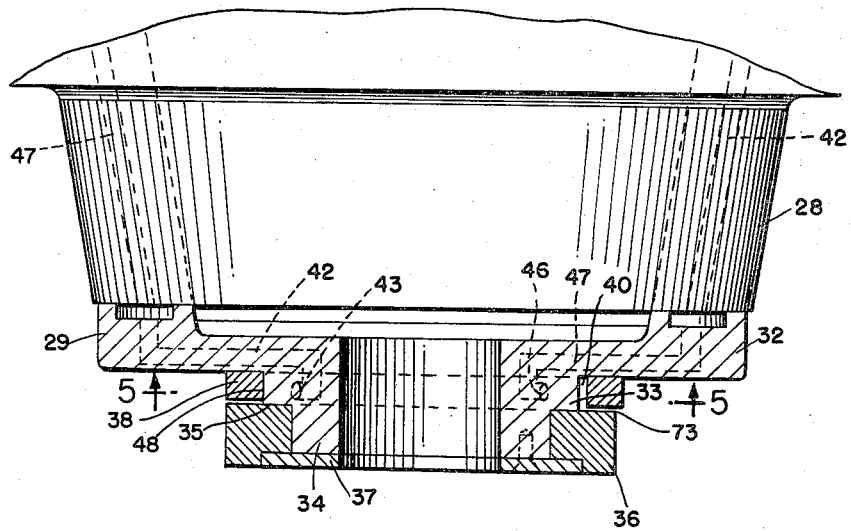
Fig. 4 is an elevational view, partly in section of a detail of the milling head assembly showing the template follower and the control valve sensing means.
Figure 5:
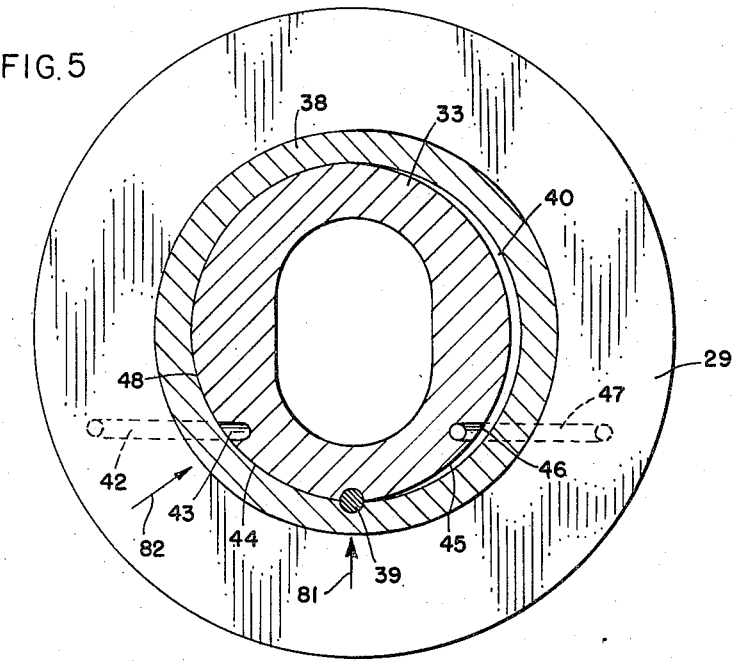
Fig. 5 is a sectional plan view taken substantially on line 5—5 of Fig. 4.

According to the present invention means are provided for automatically rotating the support ring in response to the contour of the template. In the present instance this means takes the form of a sensing valve indicated generally by reference numeral 29, and shown best in Figs. 4 and 5. This valve includes a portion of a mount 32 forming a part of the yoke 28. Integrally formed with the mount is a member 33, elliptoid in conformation, as seen best in Fig. 5. A hub 34, generally circular in configuration, is subjoined to the member 33, thus forming a shoulder 35. A main follower 36 is rotatably mounted on the hub 34 and is retained in position by a retainer plate 37. The upper surface, as viewed in Fig. 4, of the follower 36 is disposed in continuous abutting relation to the shoulder 35. A control ring 38, generally circular in configuration, is arranged for limited rocking movement in a horizontal plane about a pin 39. As shown best in Fig. 4, the control ring 38 is disposed in an enveloping relation to the member 33 so that a chamber 40 is formed at one side or the other of the member 33 according to the position of the control ring 38, which, as will be understood, engages the profile of the template. An air passage 42 is formed in the mount 32 and communicates with a port 43 opening into a face 44 of the member 33. Opening into a corresponding face 45 of the member 33 at the opposite side of the pin 39 is a port 46 which is in communication with a passage 47. In Fig. 5 the port 43 is covered by inner face 48 of the control ring 38, while the port 46 opens freely into the chamber 40. The motor 23 is operated to rotate the support ring 12 in the desired direction according to the position of the control ring 38 i.e. whether the port 43 or the port 46 is covered. When both ports 43 and 46 are opened, as when the ring 38 is in neutral or medial position relative to its rocking axis 39, the motor 23 is at rest.

In Fig. 6 is a diagrammatic view showing the manner in which the sensing valve 29 controls the flow of primary air and thus the direction of rotation of the motor 23. In this figure a control valve 52 is disclosed which comprises essentially a cylindrical casing 53 having formed therein cylinders 54 at opposite ends. Each cylinder 54 has a bore 56 and a counterbore 57 joined by a substantially frusto-conical face 58 which forms a seat for a similarly formed face 59 on a plunger 62 which is slidably received in the bore 56 and is provided with an extension 63 for reception in the counterbore 57 when the plunger is seated, as shown in the right hand cylinder in Fig. 6. The plunger 62 has a bore 64 in communication with a centrally disposed restricted orifice 65 for a purpose hereafter described. In each bore 64 is disposed a compression spring 66 for urging the plunger 62 into an engagement with its seat. The outer end of each spring 66 is arranged in abutment with the inner surface of an end cap 67. These end caps 67 are provided with central apertures 68 for communication with the ports 43 and 46 of the sensing valve 29 by way of suitable conduits 68.1 and 68.2, and the respective passages 42 and 47.

In particular, the cylinder 54 to the left in Fig. 6 receives primary fluid, such as air or the like, from a suitable source through a radial aperture 72 communicating with its respective counterbore 57. The left aperture 68 communicates with the port 46 so that primary air is permitted to flow through the orifice 65 to the chamber 40, when the ring 38 assumes the position shown in Fig. 5. According to the present invention, the thickness of the control ring 38 is dimensioned so that a space 73 is formed between the ring 38 and the main follower 36. Through this space air passing through the orifice 65 of the left plunger 62, as shown in Fig. 6, is exhausted. Since this incoming primary air is resisted only by the spring 66 the left plunger 62 is forced by the incoming primary air to the open position shown. The radial outlet aperture 70 communicates with each cylinder 54 and forms, in conjunction with its associated aperture 72, counterbore 57 and cylinder 54, a passage for the flow of primary air through the control valve to the motor 23 for rotation of the support ring 12 in one direction.

Unseating of the cylinder 62 on the right in Fig. 6 is prevented by the covering of the port 43 by the control ring 38. The sudden closing of the port 43 by the movement of the control ring 38 in response to the profile of the template permits primary air, which enters this cylinder 54 through a radial inlet aperture 72, to flow through the corresponding restricted orifice 65 to form a secondary air system at a reduced pressure. It will be noted that the total surface area of the plunger 62 on the right side of the orifice 65 greatly exceeds the area of the face of the extension 63. As a result, this secondary air, in cooperation with the spring 66 of the right hand cylinder retains this cylinder on its respective seat and no communication is established with the motor 23 from this side of the control valve.

Covering of the port 46 and uncovering of the port 43, as by radial pressure on the control ring 38 at the right side of the pivot axis 39, as viewed in Fig. 5, will result in the opposite operation of the control valve 52 from that just described, and the motor 23 will be operated in the other direction.

Referring now to Figs. 6 and 7 an exhaust valve 75 is arranged in a conduit connecting each of the apertures 70 to the motor 23. This exhaust valve permits the flow of air under pressure from the left, as viewed in Fig. 7, to force a ball 76 into contact with a seat 77. The air then flows through a passage 78 to the motor. When the primary air from this source is cut off by the action of the control valve 52 and the motor is rotated in the opposite direction, the ball 76 is urged against a seat 79 by a spring 80 to close off the supply side and entrapped air from the motor then flows in the opposite direction in the passage 78 through a passage 80 to atmosphere. It will be understood that both of the exhaust valves 75 operate in a similar manner to afford instant reversal of the direction of rotation of the motor 23.

The positioning control means of the present invention obviates the need in prior devices for the service of an operator to effect rotation of the support ring 12 so that the compensator 17 is effective to urge the cutter 27 into contact normal to the edge of the workpiece at all times. The sensing valve 29 operates instantaneously to position the plungers 62 so that one or the other of the primary air passages of the control valve 52 is opened to operate the motor 23, whenever the control ring 38 is shifted to one side or the other of a middle position with respect to the pivot pin 39. When the motor 23 has turned the supporting ring 12 a sufficient distance so that the pressure from the template is again centered toward the pin 39 and the control ring is in a medial position, the control valve 52 becomes balanced and the motor 23 is stopped. This holds the milling head assembly so that the cutter will act in a direction normal to the profile of the pattern until the control ring is again shifted by a change of direction in the pattern contour. The direction of normal work pressure is indicated by the arrow 81 in Fig. 5 and the direction of an actuating pressure to cause clockwise turning of the milling head is indicated by the arrow 82.

It will be apparent that this invention may be embodied in devices which differ in many respects and details from the particular embodiment disclosed. All modifications which do not go beyond the scope of the invention will readily suggest themselves to those skilled in the art. It is, therefore, not intended that the invention be limited to the exact construction shown and described, but only to the inventive concept as defined in the appended claims.

I claim:

1. A positioning control valve system comprising a sensing valve and a control valve, said sensing valve including a relatively stationary substantially elliptical member, a substantially circular control ring pivotally mounted on said member in surrounding relation thereto to swing from side to side relative to the major elliptical axis of said member, said member having a pair of ports each opening to the periphery of said member on a respective side of the said major elliptical axis and within the confines of said control ring, said control ring being pivoted intermediate said ports and movable laterally to cover one of said ports while uncovering the other port, said control valve comprising a pair of cylinders each having an inlet and outlet passage for air under pressure, a plunger slidably disposed in each of said cylinders and operable selectively to open and close one of said inlet and outlet passages, and a bleed connection from each of said cylinders to a respective one of the sensing valve ports, each of said plungers having a restricted orifice therethrough providing constant communication between the respective cylinder inlet and bleed connection, and said plungers being operable to shift to open position when the respective port in said sensing valve is opened by said control ring.

2. A positioning control valve system comprising a sensing valve and a control valve, said sensing valve including a relatively stationary substantially elliptical member, a subtantially circular control ring pivotally mounted on said member in surrounding relation thereto to swing from side to side relative to the major elliptical axis of said member, said member having a port opening within the confines of said control ring on one side of said major axis and a corresponding port opening on the opposite side of said axis, said control ring being movable to cover one of said ports while uncovering the other of said ports, said control valve having a pair of cylinders each having a connection with one of said sensing valve ports and separate inlet and outlet passages for air under pressure, a plunger slidably disposed in each cylinder and normally closing communication between said passages, and each plunger having a restricted orifice therethrough leading to the respective inlet passage and in constant communication with the respective cylinder connection to the respective one of said sensing valve ports, said orifice and connection providing a secondary air outlet from each cylinder for actuating the respective plunger to open position when the respective sensing valve port is uncovered by said control ring.

3. A positioning control system comprising a sensing valve and a control valve; said sensing valve including a relatively stationary substantially elliptical member, a substantially circular control ring pivotally mounted on said member in surrounding relation thereto to swing between eccentric positions on opposite sides of the major elliptical axis of said member, said member having a port opening into one face thereof on one side of said major axis and a corresponding port opening into the opposite face thereof on the other side of said major axis, said control ring being movable to cover one of said ports while uncovering the other of said ports; said control valve comprising a casing having a pair of cylinders formed therein, each of said cylinders being formed with a bore and a counterbore joined to said bore by a substantially frusto-conical seat, a plunger slidably disposed in the bore of each of said cylinders, each of said plungers having a front face corresponding to said seat and being movable between seated and unseated positions to close and open communication between said bore and counterbore, inlet means in said casing for supplying air under pressure to each of said counterbores, each of said bores having an outlet adjacent the respective seat and controlled by said plunger, each of said plungers having a restricted orifice therethrough leading from its face and the adjacent counterbore to the cylinder bore at the rear end of the plunger, and an air conduit leading from each cylinder rearward of the plunger to a respective one of said sensing valve ports, whereby said plungers are urged to seated and unseated position in the respective cylinders by the air pressure differential between the face and rear ends of the plungers created by the closing and opening of the respective sensing valve ports.

4. A positioning control system comprising a sensing valve and a control valve; said sensing valve including a relatively stationary substantially elliptical member, a substantially circular control ring pivotally mounted on said member in surrounding relation thereto, said member having a port opening to its periphery on one side of its major elliptical axis and a corresponding port opening to its periphery on the opposite side of said axis, said contral ring being movable between eccentric positions relative to the said major axis of said member to cover one of said ports while uncovering the other of said ports for communication with atmosphere; said control valve including a pair of cylinders each having a conical seat at its forward end and a counterbore extending beyond said seat, a plunger slidably disposed in each of said cylinders and having its front end formed to seat at the forward end of the cylinder, a compression spring in each of said cylinders for normally seating said plunger, means for supplying air under pressure to the counterbore of each cylinder and outlet means in each cylinder controlled by the respective plunger, a restricted orifice in each plunger leading therethrough from the respective counterbore to the rear of the plunger, and a conduit leading from each cylinder rearward of the respective plunger to a respective one of said sensing valve ports.

5. In a positioning control means, a sensing valve comprising a substantially elliptical member having a pair of air passages therein each terminating in a respective port opening to atmosphere at the periphery of said member and located on a respective side of the major elliptical axis of said member, and a substantially circular control ring surrounding said member in the plane of said ports, said control ring being pivoted on the periphery of said member adjacent the intersection of the said major axis therewith and movable from side to side to selectively open one of said ports and close the other port.

6. In a positioning control means, a sensing valve comprising a substantially elliptical member having a pair of air passages therein each terminating in a respective port opening to atmosphere at the periphery of said member and located on a respective side on the major elliptical axis of said member, an annular follower rotatively mounted on said member below the plane of said ports, and a substantially circular control ring surrounding said member in the plane of said ports, said control ring being pivoted on the periphery of said member adjacent the intersection of said major axis therewith and movable from side to side to selectively open one of said ports and close the other, and said control ring being of greater outside diameter than said follower and located with respect thereto so as to project beyond the periphery of the follower on each side of the said major axis of said member.

References Cited in the file of this patent

UNITED STATES PATENTS

| | | |
|---|---|---|
| 2,003,557 | Sassen | June 4, 1935 |
| 2,058,642 | Sperry | Oct. 27, 1936 |
| 2,142,061 | Sassen | Dec. 27, 1938 |
| 2,226,191 | Alkan | Dec. 24, 1940 |
| 2,283,810 | Johnson | May 19, 1942 |
| 2,539,131 | Gundersen et al. | Jan. 23, 1951 |
| 2,723,598 | Mann | Nov. 15, 1955 |
| 2,767,620 | Bentley | Oct. 23, 1956 |